US011946432B2

(12) United States Patent
Pack et al.

(10) Patent No.: US 11,946,432 B2

(45) Date of Patent: Apr. 2, 2024

(54) THROTTLE BODY WITH REDUCED DEPOSIT ACCUMULATION AND ENHANCED THERMAL CONDUCTIVITY

(71) Applicant: GM Global Technology Operations LLC, Detroit, MI (US)

(72) Inventors: Seongchan Pack, West Bloomfield Township, MI (US); Dean G. Sorrell, Vinita, OK (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 140 days.

(21) Appl. No.: 17/815,796

(22) Filed: Jul. 28, 2022

(65) Prior Publication Data

US 2024/0035421 A1 Feb. 1, 2024

(51) Int. Cl.

*F02D 9/10* (2006.01)

*F02B 77/04* (2006.01)

(52) U.S. Cl.

CPC ............ *F02D 9/1075* (2013.01); *F02B 77/04* (2013.01); *F02D 9/1005* (2013.01)

(58) Field of Classification Search

CPC ....... F02D 9/1075; F02D 9/1005; F02B 77/04

USPC .......................................... 148/537; 123/337

See application file for complete search history.

(56) References Cited

U.S. PATENT DOCUMENTS

2008/0029061 A1* 2/2008 Sugiyama ............... F02D 9/108 123/337

2009/0308349 A1* 12/2009 Apel ..................... F02D 9/1005 123/337

* cited by examiner

*Primary Examiner* — Mahmoud Gimie

(74) *Attorney, Agent, or Firm* — Vivacqua Crane PLLC

(57) ABSTRACT

A throttle body for an engine or fuel cell of a vehicle is provided. The throttle body comprises a cylindrical housing comprising a first open end extending to a second open end defining an inner wall having an inner surface. The throttle body further comprises a moveable blade valve movably disposed on the inner wall and arranged to regulate air to the engine during operation of the vehicle. The moveable blade valve has an outer surface. The throttle body further comprises a dual-phase thermal composite coating (TCC) disposed on one of the inner surface of the inner wall and outer surface of the moveable blade valve for enhanced thermal conductivity and reduced deposit accumulation on the inner surface and the outer surface. The dual-phase TCC comprises a first material comprising between 10 wt % and 90 wt %, and a second material comprising between 10 wt % and 90 wt % of the dual-phase TCC. The dual phase TCC has a contact angle of between 100° and 160° and a thermal conductivity of at least 0.3 W/mK.

20 Claims, 3 Drawing Sheets

THROTTLE BODY WITH REDUCED DEPOSIT ACCUMULATION AND ENHANCED THERMAL CONDUCTIVITY

INTRODUCTION

The present disclosure relates to throttle bodies for an engine or fuel cell of a vehicle and, more particularly, throttle bodies with reduced deposit accumulation and enhanced thermal conductivity.

Organic deposits may accumulate in the throttle body that may lead to restricted air flow and mechanical issue which are undesirable. Such circumstances may further lead to increased warranty costs to clean or replace vehicular components. Moreover, some algorithmic methods to adjust control air flow may have practical limitations.

SUMMARY

Thus, while current throttle bodies achieve their intended purpose, there is a need for a new and improved throttle body with reduced deposit accumulation and enhanced thermal conductivity.

One aspect of the present disclosure provides a throttle body for an engine or fuel cell of a vehicle. The throttle body is arranged to have enhanced thermal conductivity and reduced deposit accumulation therein. The throttle body comprises a cylindrical housing comprising a first open end extending to a second open end defining an inner wall having an inner surface. The throttle body further comprises a moveable blade valve movably disposed on the inner wall and arranged to regulate air to the engine during operation of the vehicle. The moveable blade valve has an outer surface.

The throttle body further comprises a dual-phase thermal composite coating (TCC) disposed on one of the inner surface of the inner wall and outer surface of the moveable blade valve for enhanced thermal conductivity and reduced deposit accumulation on the inner surface and the outer surface. The dual-phase TCC comprises a first material and a second material. The first material comprises between 10 weight percent (wt %) and 90 wt % and the second material comprising between 10 wt % and 90 wt % of the dual-phase TCC. The dual phase TCC has a contact angle of between 100 degrees (°) and 160° and a thermal conductivity of at least 0.3 W/mK.

In one embodiment of this aspect, the first material is 90 wt %, the second material is 10 wt %, and the thermal conductivity is between 0.3 W/mK and 1 W/mK. In another embodiment, the first material is 50 wt %, the second material is 50 wt %, and the thermal conductivity is between 3 W/mK and 5 W/mK. In yet another embodiment, the first material is 30 wt %, the second material is 70 wt %, and the thermal conductivity is between 20 W/mK and 30 W/mK. In still another embodiment, the first material is 10 wt %, the second material is 90 wt %, and the thermal conductivity is between 60 W/mK and 100 W/mK.

In one embodiment of this aspect, the first material comprises one of parylene, polyesters, polyurethane, polyurea, polyarylate, polyethylene, epoxy, polyoxymethylene, polypthaldamide, polyamide, polyphenylene sulfide, polyether ether ketone, polyether ketone, polyimide, polysiloxane, polydimethylsiloxane, poly(methyl methacrylate), methyltrimethoxysilane, and polyflorocarbons. In another embodiment, the second material comprises one of copper, zinc, aluminum, gold, silver, cobalt, manganese, carbon black, graphene, AL-bronze, aluminum silicates, $SiO_2$, CuO, ZnO, $TiO_2$, $MoS_2$, and $Al_2O_3$.

In one embodiment of this aspect, the dual TCC has a coefficient of friction of between 0.01 and 0.2. In another embodiment, the dual-phase TCC has a surface roughness of between 10 Ra and 60 Ra. In yet another embodiment, the contact angle is between 110° and 140°.

In another aspect of the present disclosure, a dual-phase thermal composite coating (TCC) for enhanced thermal conductivity and reduced deposit accumulation in a throttle body of an engine of a vehicle is provided. The dual-phase TCC comprises a first material comprising one of parylene, polyesters, polyurethane, polyurea, polyarylate, polyethylene, epoxy, polyoxymethylene, polypthaldamide, polyamide, polyphenylene sulfide, polyether ether ketone, polyether ketone, polyimide, polysiloxane, polydimethylsiloxane, poly(methyl methacrylate), methyltrimethoxysilane, and polyflorocarbons. In this embodiment, the first material comprises between 10 weight percent (wt %) and 90 wt % of the dual-phase TCC.

The dual-phase TCC further comprises a second material comprising one of copper, zinc, aluminum, gold, silver, cobalt, manganese, carbon black, graphene, AL-bronze, aluminum silicates, $SiO_2$, CuO, ZnO, $TiO_2$, $MoS_2$, and $Al_2O_3$, the second material comprising between 10 wt % and 90 wt % of the dual-phase TCC. In this aspect, the dual phase TCC has a contact angle of between 100 degrees (°) and 160° and a thermal conductivity of at least 0.3 W/mK.

In one embodiment, the first material is 90 wt %, the second material is 10 wt %, and the thermal conductivity is between 0.3 W/mK and 1 W/mK. In another embodiment, the first material is 50 wt %, the second material is 50 wt %, and the thermal conductivity is between 3 W/mK and 5 W/mK. In yet another embodiment, the first material is 30 wt %, the second material is 70 wt %, and the thermal conductivity is between 20 W/mK and 30 W/mK. In still another embodiment, the first material is 10 wt %, the second material is 90 wt %, and the thermal conductivity is between 60 W/mK and 100 W/mK.

In one embodiment, the dual TCC has a coefficient of friction of between 0.01 and 0.2. In another embodiment, the dual-phase TCC further comprises a surface roughness of between 10 Ra and 60 Ra.

In yet another aspect of the present disclosure, a throttle body for an engine of a vehicle is provided. The throttle body is arranged to have enhanced thermal conductivity and reduced deposit accumulation therein. The throttle body comprises a cylindrical housing comprising a first open end extending to a second open end defining an inner wall having an inner surface. The throttle body further comprises a moveable blade valve movably disposed on the inner wall and arranged to regulate air to the engine during operation of the vehicle. The moveable blade valve has an outer surface.

In this aspect, the throttle body further comprises a dual-phase thermal composite coating (TCC) disposed on one of the inner surface of the inner wall and outer surface of the moveable blade valve for enhanced thermal conductivity reduced deposit accumulation on the inner surface and the outer surface. The dual-phase TCC comprises a first material and a second material. The first material comprises one of parylene, polyesters, polyurethane, polyurea, polyarylate, polyethylene, epoxy, polyoxymethylene, polypthaldamide, polyamide, polyphenylene sulfide, polyether ether ketone, polyether ketone, polyimide, polysiloxane, polydimethylsiloxane, poly(methyl methacrylate), methyltrimethoxysilane, and polyflorocarbons.

The second material comprising one of copper, zinc, aluminum, gold, silver, cobalt, manganese, carbon black, graphene, AL-bronze, aluminum silicates, $SiO_2$, CuO, ZnO, $TiO_2$, $MoS_2$, and $Al_2O_3$. The first material comprises between 10 weight percent (wt %) and 90 wt % and the second material comprises between 10 wt % and 90 wt % of the dual-phase TCC. The dual phase TCC has a contact angle of between 100 degrees (°) and 160° and a thermal conductivity of at least 0.3 W/m K.

In one embodiment, the first material is 90 wt %, the second material is 10 wt %, and the thermal conductivity is between 0.3 W/mK and 1 W/mK. In another embodiment, the first material is 50 wt %, the second material is 50 wt %, and the thermal conductivity is between 3 W/mK and 5 W/mK.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Aspects of the present disclosure provide a throttle body with reduced deposit accumulation and enhance thermal conductivity by way of a dual portioned thermal composite coating. Deposit accumulation may be by way of moisture droplets, hydrocarbon residue, carbon deposits (or "coke"), or any other material that may accumulate in the throttle body and affect optimal air flow therethrough. The coating is disposed on an inner surface and an inner component of the throttle body, and comprises first and second material components. The first material is a hydrophobic component or portion that allows for reduced accumulation in the throttle body. The second material is a thermal conductive component that allows for the enhanced thermal conductivity of the throttle body. The hydrophobicity and thermal conductivity components allow for optimal lifetime performance of the throttle body, thereby reducing deposit accumulation and enhancing thermal conductivity therein.

Figure 1:
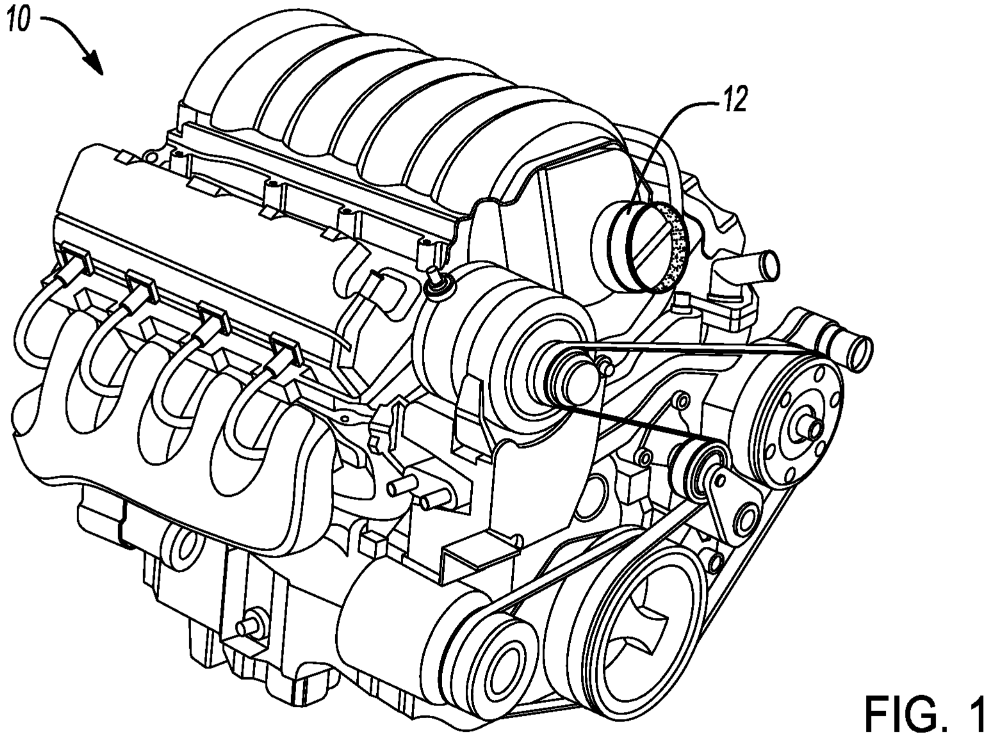
FIG. 1 is a perspective view of an engine having a throttle body with enhanced thermal conductivity and reduced deposit accumulation in accordance with one embodiment of the present disclosure.
Figure 2:
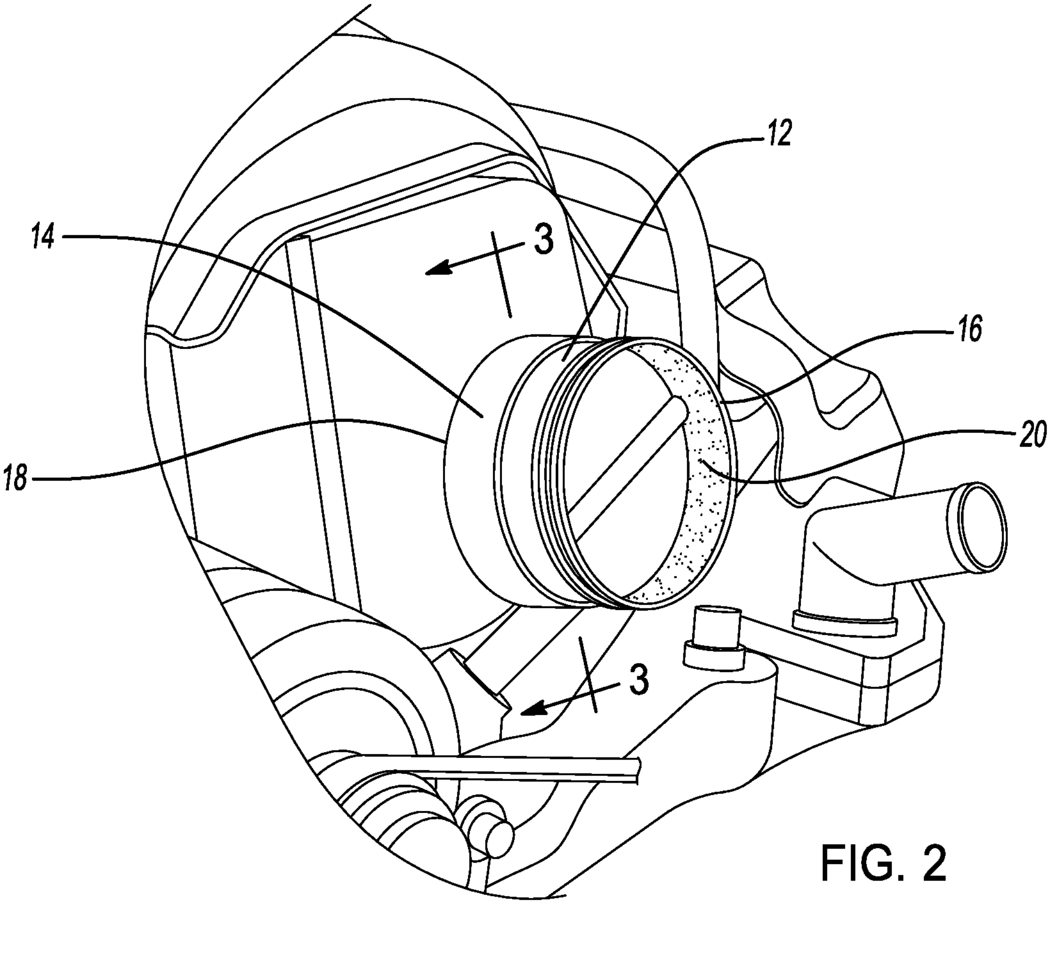
FIG. 2 is a perspective view of the throttle body of the engine in FIG. 1.
Figure 3:
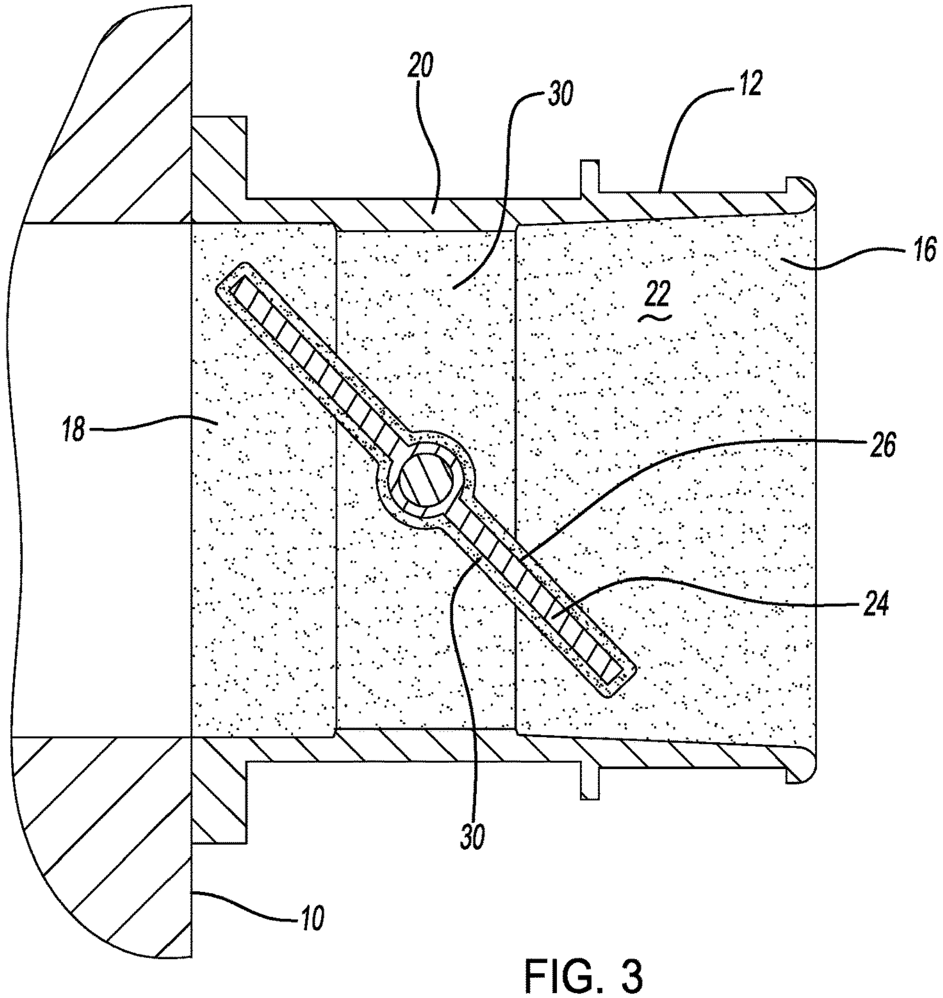
FIG. 3 is a cross-sectional side view of the throttle body in FIG. 2.

FIG. 1 illustrates an engine 10 of a vehicle comprising a throttle body 12 having enhanced thermal conductivity and reduced deposit accumulation therein in accordance with one embodiment of the present disclosure. As shown in FIGS. 1-2, the throttle body 12 comprises a cylindrical housing 14 comprising a first open end 16 extending to and in fluid communication with a second open end 18. Referring to FIG. 3, the cylindrical housing 14 defines an Inner wall 20 having an Inner surface 22.

In this embodiment, the throttle body 12 further comprises a moveable blade valve 24 movably disposed on the inner wall 20. The moveable blade valve 24 is arranged to regulate air through the throttle body 12 to an intake manifold (not shown) of the engine 10 during operation of the vehicle. As shown, the moveable blade valve 24 has an outer surface 26.

Figure 4:
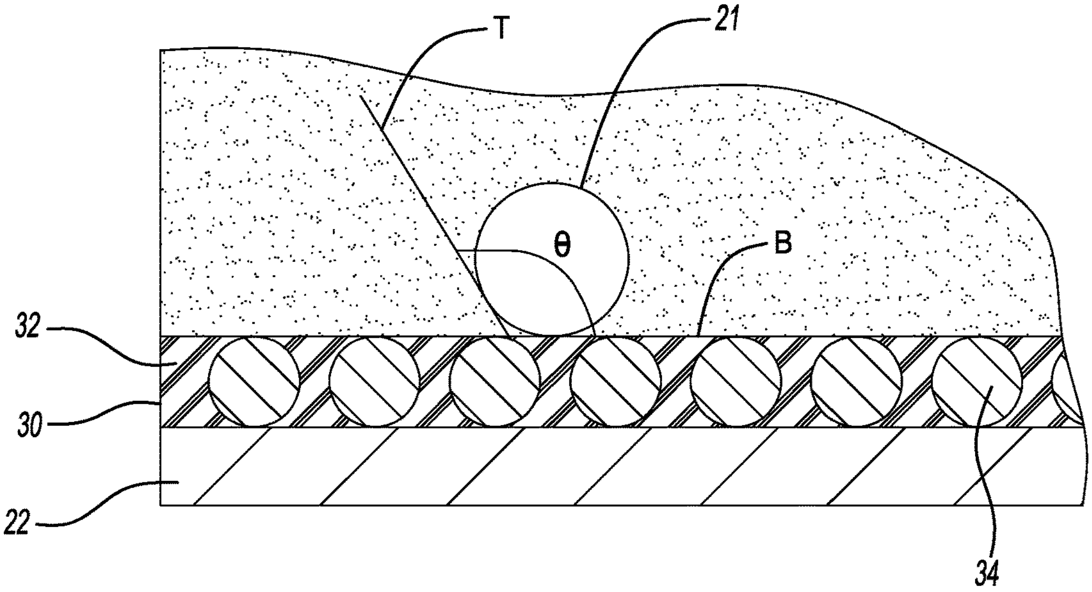
FIG. 4 is a side view of a conceptual image of an inner surface of the throttle body having a dual-phase thermal composite coating with enhanced thermal conductivity and reduced deposit accumulation in accordance with one embodiment of the present disclosure.

The throttle body 12 further comprises a dual-phase or dual-portion thermal composite coating (TCC) 30 disposed on one of the inner surface 22 of the inner wall 20 and outer surface 26 of the moveable blade valve 24 for enhanced thermal conductivity and reduced deposit accumulation on the inner surface 22 and the outer surface 26. The dual-phase TCC 30 comprises a first material 32 and a second material 34 (FIG. 4). The first material 32 is related to hydrophobicity and may comprise a "soft" material such as a polymer. Moreover, the second material 34 is related to the thermal conductivity and may comprise a "hard" material such as a metal.

It is to be understood that the dual-phase TCC may be disposed on the inner surface 22, the outer surface 26, or both. As shown in the figures, the dual-phase TCC is disposed on both the inner surface 22 and the outer surface 26. However, the dual-phase TCC may be disposed on the inner surface 22 only or the outer surface 26 only without departing from the spirit or scope of the present disclosure.

In this embodiment, the first material 32 comprises between weight percent (wt %) and 90 wt % and the second material 34 comprising between 10 wt % and 90 wt % of the dual-phase TCC 30. The dual phase TCC has a contact angle of between 100 degrees (0) and 160° and a thermal conductivity of at least 0.3 W/mK.

In one example, the first material 32 may be 90 wt %, the second material 34 may be 10 wt %, and the thermal conductivity may be between 0.3 W/mK and 1 W/mK. It is to be understood that the first material 32 may comprise 10 wt %, 15 wt %, 20 wt %, 25 wt %, 30 wt %, 35 wt %, 40 wt %, 45 wt %, 50 wt %, 55 wt %, 60 wt %, 65 wt %, 70 wt %, 75 wt %, 80 wt %, 85 wt %, or of the dual-phase TCC 30 without departing from the spirit or scope of the present disclosure. Moreover, the second material 34 may comprise 10 wt %, 15 wt %, 20 wt %, 25 wt %, 30 wt %, 35 wt %, 40 wt %, 45 wt %, 50 wt %, 55 wt %, 60 wt %, 65 wt %, 70 wt %, 75 wt %, 80 wt %, 85 wt %, or 90 wt % of the dual-phase TCC 30 without departing from the spirit or scope of the present disclosure.

Additionally, it is to be understood that the thermal conductivity may be 0.3 W/mK, 0.5 W/mK, 1 W/mK, 10 W/mK, 20 W/mK, 30 W/mK, 40 W/mK, 50 W/mK, 60 W/mK, 70 W/mK, 80 W/mK, 90 W/mK, or 100 W/mK without departing from the spirit or scope of the present disclosure. Furthermore, the contact angle may be 100°, 110°, 120°, 130°, 140°, 150°, or 160° without departing from the spirit or scope of the present disclosure.

For example, the first material 32 may be 50 wt %, the second material 34 may be 50 wt %, and the thermal conductivity may be between 3 W/mK and 5 W/mK. In another example, the first material 32 may be 30 wt %, the second material 34 may be 70 wt %, and the thermal conductivity may be between 20 W/mK and 30 W/mK. In yet another example, the first material 32 may be 10 wt %, the second material 34 may be 90 wt %, and the thermal conductivity may be between 60 W/mK and 100 W/mK.

As shown in FIG. 4, the contact angle θ is an angle at which a matter 21 (e.g., a moisture droplet) may rest or be disposed on, for example, the dual-phase TCC 30 of inner surface 22. As it can be seen, the contact angle θ may be measured as between a baseline B and a tangent T relative to a curvature (or profile) of the droplet or mass. In this example, the contact angle θ is an angle between the baseline B defined by the dual-phase TCC 30 and the tangent T defined by the curvature or profile of matter 21. As such, a larger contact angle indicates a smaller surface area contact between the matter and the inner surface 22.

In one embodiment of this aspect, the dual-phase TCC 30 has a coefficient of friction of between 0.01 and 0.2. it is to be understood that the dual-phase TCC 30 may have a coefficient of friction of 0.01, 0.02, 0.03, 0.04, 0.06, 0.07, 0.08, 0.09, 0.10, 0.11, 0.12, 0.13, 0.14, 0.15, 0.16, 0.17, 0.18, or 0.20 without departing from the spirit or scope of the present disclosure.

In another embodiment, the dual-phase TCC 30 has a surface roughness of between 10 Ra and 60 Ra. The surface roughness may be 10 Ra, Ra, 30 Ra, 40 Ra, 50 Ra, or 60 Ra without departing from the spirit or scope of the present invention.

Figure 5:
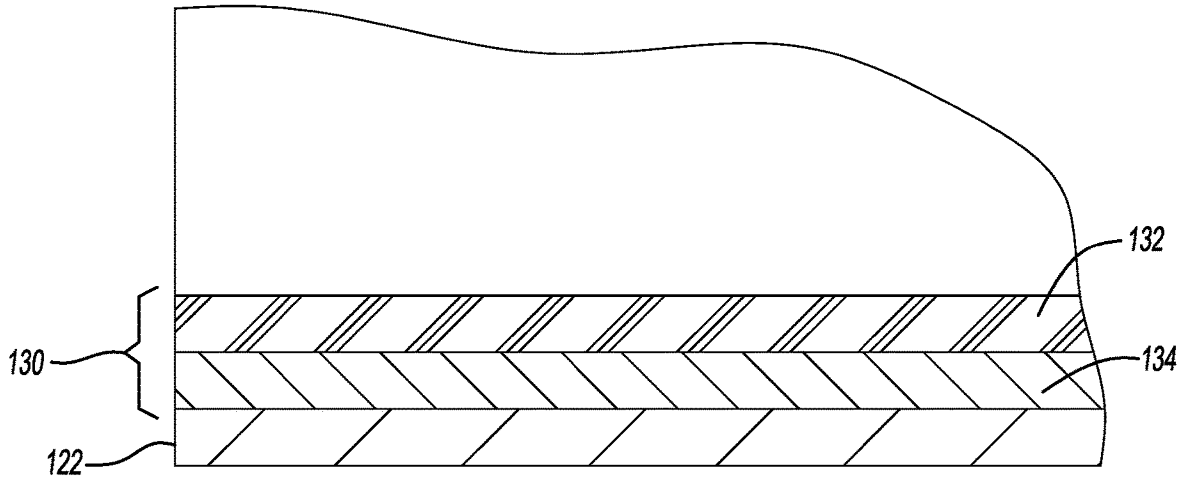
FIG. 5 is a cross-sectional side view of a dual-phase TCC in accordance with one embodiment of the present disclosure.

Referring to FIG. 5, a dual-phase TCC 130 may comprise a separated dual layer of first and second material layers 132, 134 disposed on the inner surface 122 in accordance with one embodiment of the present disclosure. In this embodiment, the first material layer 132 may comprise the first material 32 discussed above and the second material layer 134 may comprise the second material 34 discussed above. As shown, the second material layer 134 is disposed on the inner surface 122, and the first material layer 132 is disposed on the second material 134 and opposite the inner surface 122. In this embodiment, the first material layer 132 serves as an abradable coat for friction and is preferably between 2 microns and 10 microns in thickness. The second material layer 134 serves as a bond coat to the inner surface 122 and is preferably between 10 microns and 100 microns in thickness.

Figure 6:
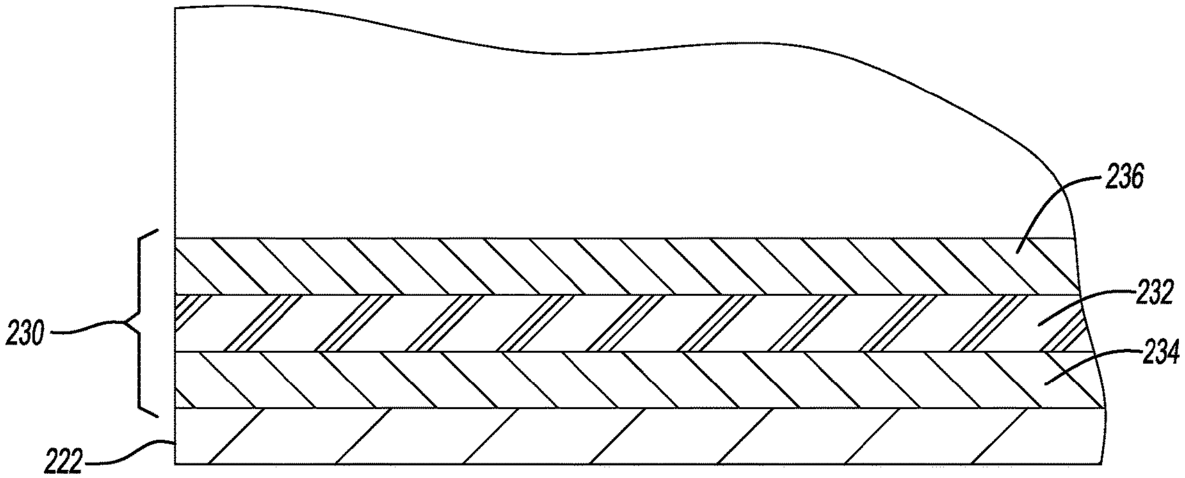
FIG. 6 is a cross-sectional side view of a dual-phase TCC in accordance with another embodiment of the present disclosure.

Referring to FIG. 6, a dual-phase TCC 230 may comprise separate multiple layers of the first and second materials 32, 34 (discussed above) disposed on the inner surface 222 in accordance with another embodiment of the present disclosure. As shown, a hard layer 234 comprising the second material 34 is disposed on the inner surface 222, and a soft layer 232 comprising the first material 32 is disposed on the hard layer 234 and opposite the inner surface 222. Additionally, the dual-phase TCC comprises another hard layer 236 comprising the second material 34 disposed on the soft layer 232 and opposite the hard layer 234.

In this embodiment, the soft layer 232 serves as a damping mechanism and is preferably between 2 microns and 10 microns in thickness. The hard layer 234 serves as a bond coat to the inner surface 222 and is preferably between 10 microns and 100 microns in thickness. The hard layer 236 serves as a structural coat for environmental condition and is preferably between 50 microns and 150 microns.

In another aspect of the present disclosure, the dual-phase or dual-portion thermal composite coating (TCC) 30 for enhanced thermal conductivity and reduced deposit accumulation in a throttle body 12 of an engine 10 of a vehicle is provided. The dual-phase TCC 30 has at least two functionalized portions, hydrophobicity and thermal conductivity. The hydrophobicity portion functions to repel moisture. Moreover, the thermal conductivity portion functions to help repel oxidized hydrocarbons. The hydrophobicity and thermal conductivity portions allow for optimal lifetime performance of the throttle body 12, thereby reducing deposit accumulation and enhancing thermal conductivity therein.

As discussed above, the dual-phase TCC 30 comprises a first material 32 and a second material 34. The first material 32 is related to the hydrophobicity portion and may comprise a "soft" material such as a polymer. Preferably, the first material 32 comprises one of parylene, polyesters, polyurethane, polyurea, polyarylate, polyethylene, epoxy, polyoxymethylene, polypthaldamide, polyamide, polyphenylene sulfide, polyether ether ketone, polyether ketone, polyimide, polysiloxane, polydimethylsiloxane, poly(methyl methacrylate), methyltrimethoxysilane, and polyflorocarbons.

Moreover, the second material 34 is related to the thermal conductivity portion and may comprise a "hard" material such as a metal. Preferably, the second material 34 comprises one of copper, zinc, aluminum, gold, silver, cobalt, manganese, carbon black, graphene, AL-bronze, aluminum silicates, $SiO_2$, CuO, ZnO, $TiO_2$, $MoS_2$, and $Al_2O_3$.

In one embodiment, the first material 32 comprises between weight percent (wt %) and 90 wt % and the second material 34 comprising between 10 wt % and 90 wt % of the dual-phase TCC 30. The dual phase TCC has a contact angle of between 100 degrees (°) and 160° and a thermal conductivity of at least 0.3 W/mK.

In one example, the first material 32 may be 90 wt %, the second material 34 may be 10 wt %, and the thermal conductivity may be between 0.3 W/mK and 1 W/mK. It is to be understood that the first material 32 may comprise 10 wt %, 15 wt %, 20 wt %, 25 wt %, 30 wt %, 35 wt %, 40 wt %, 45 wt %, 50 wt %, 55 wt %, 60 wt %, 65 wt %, 70 wt %, 75 wt %, 80 wt %, 85 wt %, or of the dual-phase TCC 30 without departing from the spirit or scope of the present disclosure. Moreover, the second material 34 may comprise 10 wt %, 15 wt %, 20 wt %, 25 wt %, 30 wt %, 35 wt %, 40 wt %, 45 wt %, 50 wt %, 55 wt %, 60 wt %, 65 wt %, 70 wt %, 75 wt %, 80 wt %, 85 wt %, or 90 wt % of the dual-phase TCC 30 without departing from the spirit or scope of the present disclosure.

Additionally, it is to be understood that the thermal conductivity may be 0.3 W/mK, 0.5 W/mK, 1 W/mK, 10 W/mK, 20 W/mK, 30 W/mK, 40 W/mK, 50 W/mK, 60 W/mK, 70 W/mK, 80 W/mK, 90 W/mK, or 100 W/mK without departing from the spirit or scope of the present disclosure. Furthermore, the contact angle may be 100°, 110°, 120°, 130°, 140°, 150°, or 160° without departing from the spirit or scope of the present disclosure.

For example, the first material 32 may be 50 wt %, the second material 34 may be 50 wt %, and the thermal conductivity may be between 3 W/mK and 5 W/mK. In another example, the first material 32 may be 30 wt %, the second material 34 may be 70 wt %, and the thermal conductivity may be between 20 W/mK and 30 W/mK. In yet another example, the first material 32 may be 10 wt %, the second material 34 may be 90 wt %, and the thermal conductivity may be between 60 W/mK and 100 W/mK.

In one embodiment of this aspect, the dual-phase TCC 30 has a coefficient of friction of between 0.01 and 0.2. it is to be understood that the dual-phase TCC 30 may have a coefficient of friction of 0.01, 0.02, 0.03, 0.04, 0.06, 0.07, 0.08, 0.09, 0.10, 0.11, 0.12, 0.13, 0.14, 0.15, 0.16, 0.17, 0.18, or 0.20 without departing from the spirit or scope of the present disclosure.

In another embodiment, the dual-phase TCC 30 has a surface roughness of between 10 Ra and 60 Ra. The surface roughness may be 10 Ra, Ra, 30 Ra, 40 Ra, 50 Ra, or 60 Ra without departing from the spirit or scope of the present invention.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A throttle body for one of an engine and fuel cell of a vehicle, the throttle body comprising:

a cylindrical housing comprising a first open end extending to a second open end defining an inner wall having an inner surface;

a moveable blade valve movably disposed on the inner wall and arranged to regulate air to the engine during operation of the vehicle, the moveable blade valve having an outer surface;

a dual-phase thermal composite coating (TCC) disposed on one of the inner surface of the inner wall and outer surface of the moveable blade valve for enhanced thermal conductivity and reduced deposit accumulation on the inner surface and the outer surface, the dual-phase TCC comprising a first material and a second material, the first material comprising between 10 weight percent (wt %) and 90 wt % and the second material comprising between 10 wt % and 90 wt % of the dual-phase TCC, the dual phase TCC having a contact angle of between 100 degrees (°) and 160° and a thermal conductivity of at least 0.3 W/mK.

2. The throttle body of claim 1 wherein the first material is 90 wt %, the second material is 10 wt %, and the thermal conductivity is between 0.3 W/mK and 1 W/mK.

3. The throttle body of claim 1 wherein the first material is 50 wt %, the second material is 50 wt %, and the thermal conductivity is between 3 W/mK and 5 W/mK.

4. The throttle body of claim 1 wherein the first material is 30 wt %, the second material is 70 wt %, and the thermal conductivity is between 20 W/mK and 30 W/mK.

5. The throttle body of claim 1 wherein the first material is 10 wt %, the second material is 90 wt %, and the thermal conductivity is between 60 W/mK and 100 W/m K.

6. The throttle body of claim 1 wherein the dual TCC has a coefficient of friction of between 0.01 and 0.2.

7. The throttle body of claim 1 wherein the first material comprises one of parylene, polyesters, polyurethane, polyurea, polyarylate, polyethylene, epoxy, polyoxymethylene, polypthaldamide, polyamide, polyphenylene sulfide, polyether ether ketone, polyether ketone, polyimide, polysiloxane, polydimethylsiloxane, poly(methyl methacrylate), methyltrimethoxysilane, and polyflorocarbons.

8. The throttle body of claim 1 wherein the second material comprises one of copper, zinc, aluminum, gold, silver, cobalt, manganese, carbon black, graphene, AL-bronze, aluminum silicates, $SiO_2$, CuO, ZnO, $TiO_2$, $MoS_2$, and $Al_2O_3$.

9. The throttle body of claim 1 wherein the dual-phase TCC has a surface roughness of between 10 Ra and 60 Ra.

10. The throttle body of claim 1 wherein the contact angle is between 110° and 160°.

11. The throttle body of claim 1 wherein the first material is 90 wt %, the second material is 10 wt %, and the thermal conductivity is between 0.3 W/mK and 1 W/mK.

12. The throttle body of claim 1 wherein the first material is 50 wt %, the second material is 50 wt %, and the thermal conductivity is between 3 W/mK and 5 W/mK.

13. A dual-phase thermal composite coating (TCC) for enhanced thermal conductivity and reduced deposit accumulation in a throttle body of an engine of a vehicle, the dual-phase TCC comprising:

a first material comprising one of parylene, polyesters, polyurethane, polyurea, polyarylate, polyethylene, epoxy, polyoxymethylene, polypthaldamide, polyamide, polyphenylene sulfide, polyether ether ketone, polyether ketone, polyimide, polysiloxane, polydimethylsiloxane, poly(methyl methacrylate), methyltrimethoxysilane, and polyflorocarbons, the first material comprising between 10 weight percent (wt %) and 90 wt % of the dual-phase TCC;

a second material comprising one of copper, zinc, aluminum, gold, silver, cobalt, manganese, carbon black, graphene, AL-bronze, aluminum silicates, $SiO_2$, CuO, ZnO, $TiO_2$, $MoS_2$, and $Al_2O_3$, the second material comprising between 10 wt % and 90 wt % of the dual-phase TCC, wherein the dual phase TCC has a contact angle of between 100 degrees (°) and 160° and a thermal conductivity of at least 0.3 W/mK.

14. The dual phase TCC of claim 13 wherein the first material is 90 wt %, the second material is 10 wt %, and the thermal conductivity is between W/mK and 1 W/mK.

15. The dual phase TCC of claim 13 wherein the first material is 50 wt %, the second material is 50 wt %, and the thermal conductivity is between 3 W/mK and 5 W/mK.

16. The dual phase TCC of claim 13 wherein the first material is 30 wt %, the second material is 70 wt %, and the thermal conductivity is between W/mK and 30 W/mK.

17. The dual phase TCC of claim 13 wherein the first material is 10 wt %, the second material is 90 wt %, and the thermal conductivity is between W/mK and 100 W/mK.

18. The dual phase TCC of claim 13 wherein the dual TCC has a coefficient of friction of between 0.01 and 0.2.

19. The dual phase TCC of claim 13 further comprising a surface roughness of between 10 Ra and 60 Ra.

20. A throttle body for an engine of a vehicle, the throttle body comprising:

a cylindrical housing comprising a first open end extending to a second open end defining an inner wall having an inner surface;

a moveable blade valve movably disposed on the inner wall and arranged to regulate air to the engine during operation of the vehicle, the moveable blade valve having an outer surface;

a dual-phase thermal composite coating (TCC) disposed on one of the inner surface of the inner wall and outer surface of the moveable blade valve for enhanced thermal conductivity reduced deposit accumulation on the inner surface and the outer surface, the dual-phase TCC comprising a first material and a second material, the first material comprising one of parylene, polyesters, polyurethane, polyurea, polyarylate, polyethylene, epoxy, polyoxymethylene, polypthaldamide, polyamide, polyphenylene sulfide, polyether ether ketone, polyether ketone, polyimide, polysiloxane, polydimethylsiloxane, poly(methyl methacrylate), methyltrimethoxysilane, and polyflorocarbons, the second material comprising one of copper, zinc, aluminum, gold, silver, cobalt, manganese, carbon black, graphene, AL-bronze, aluminum silicates, $SiO_2$, CuO, ZnO, $TiO_2$, $MoS_2$, and $Al_2O_3$, the first material comprising between 10 weight percent (wt %) and 90 wt % and the second material comprising between wt % and 90 wt % of the dual-phase TCC, the dual phase TCC having a contact angle of between 100 degrees (°) and 160° and a thermal conductivity of at least 0.3 W/mK.

* * * * *